United States Patent [19]

King, Sr.

[11] Patent Number: 5,181,821
[45] Date of Patent: Jan. 26, 1993

[54] BRAKE DRUM SUPPORT APPARATUS

[76] Inventor: Connie L. King, Sr., HC2 Box 6719, Pipe Creek, Tex. 78063-9524

[21] Appl. No.: 716,268

[22] Filed: Jun. 17, 1991

[51] Int. Cl.⁵ ............................................. B60B 30/10
[52] U.S. Cl. ...................................... 414/427; 269/17; 254/133 R; 414/607
[58] Field of Search ................ 414/426, 427, 428, 429, 414/589, 607; 269/17; 254/133 R, 134, DIG. 16; 29/273

[56] References Cited

U.S. PATENT DOCUMENTS

| | | | |
|---|---|---|---|
| 1,523,486 | 1/1925 | Manley . | |
| 2,232,744 | 2/1951 | Thames | 254/7 |
| 2,326,684 | 8/1943 | Ross | 214/65.4 |
| 2,490,233 | 12/1949 | Schildmeier | 214/1 |
| 3,145,859 | 8/1964 | Barosko | 214/331 |
| 3,734,304 | 5/1973 | Cabaniss | 414/428 X |
| 3,830,387 | 8/1974 | Virnig | 414/427 |
| 3,958,793 | 5/1976 | Garate | 254/133 RX |
| 4,447,186 | 5/1984 | Renfro et al. | 414/589 |
| 4,607,823 | 8/1986 | Thomas | 254/134 |
| 4,692,084 | 9/1987 | Persson | 414/607 |
| 4,735,546 | 4/1988 | Conley | 414/607 |
| 4,771,531 | 9/1988 | Asher | 29/326.3 |
| 5,007,789 | 4/1991 | Painter | 414/426 X |

Primary Examiner—Michael S. Huppert
Assistant Examiner—James Keenan
Attorney, Agent, or Firm—Walker, McKenzie & Walker

[57] ABSTRACT

A brake drum support apparatus for use with a vehicle having a brake drum and for supporting the brake drum as the brake drum is removed from the vehicle. The brake drum support apparatus includes a base for resting on a support surface; a drum cradle for cradling the brake drum; and a drum cradle brace structure for attaching the drum cradle to the base.

4 Claims, 3 Drawing Sheets ized off the floor and supported by the parking dolly. By supporting part of or the complete weight of the airplane on two or more such parking dollies, the plane can be moved in any direction over the floor.

BRAKE DRUM SUPPORT APPARATUS

BACKGROUND OF THE INVENTION

1. Field of the Invention

The present invention relates to a support apparatus for use with a vehicle having a brake drum and for supporting the brake drum as the brake drum is removed from the vehicle.

2. Description of the Related Art

The brake drums of large vehicles including trucks, farm equipment, and construction equipment, etc., must be periodically and routinely removed for inspection and repair, etc. Such brake drums alone often weigh well over 100 pounds. Perhaps, the most common method of removing and replacing such heavy brake drums is for one person to physically lift a brake drum from an axle of the vehicle, take the brake drum to a work area, and lift the brake drum back onto the axle of the vehicle. Such a physical method is highly dangerous to both the worker and the mechanical components, extremely tiring for the worker especially when it is considered that a typical large truck may require four separate brake drums to be removed and replaced, and very time consuming. Further, to remove and inspect such brake drums, the entire wheel and wheel hub must also be removed with a combined weight of several hundred pounds.

A number of apparatuses have been developed for supporting and/or facilitating the removal and replacement of the heavy wheels of trucks, farm equipment, airplanes, construction equipment and the like. A preliminary patentability search conducted in class 414, subclasses 426, 427, 428 and 429 produced the following patents:

Manley, U.S. Pat. No. 1,523,486, issued Jan. 20, 1925, discloses a "wheel truck" including a wheeled base for being rolled along the floor of a garage or other workshop, a pair of projecting fingers 54 coupled to the base for being moved to a position on either side of a truck wheel, a hoist means for raising the fingers 54 until the truck wheel is supported by the fingers 54, and securing means for securing the truck wheel relative to the fingers 54 s that the truck wheel can be rolled about the garage or workshop on the "wheel truck" after the fingers 54 are raised sufficiently to support the truck wheel.

Thames, U.S. Pat. No. 2,232,744, issued Feb. 25, 1941, discloses a "wheel truck" having a saddle plate 24 for supporting a wheel, and having a hook assembly 29 for securing the wheel in place upon the saddle plate 24. To use the Thames "wheel truck," the vehicle is first jacked up to lift the desired wheel off the ground. The "wheel truck" is then rolled under the wheel until the wheel rests on the saddle plate 24. The wheel is then secured to the saddle plate 24 with the hook assembly 29. The wheel can then be disconnected from the vehicle and the "wheel truck" with the wheel secured thereto can be moved laterally from the vehicle to the desired location.

Ross, U.S. Pat. No. 2,326,684, issued Aug. 10, 1943, discloses a parking dolly especially for use in parking airplanes and the like. The Ross parking dolly includes a wheeled frame for being rolled along the floor of an airplane hanger or the like, a pair of oppositely facing shoes 47 coupled to the frame for engaging opposite lower portions of a wheel of the airplane, and means for raising the shoes 47 until the airplane wheel is ifted off the floor and supported by the parking dolly. By supporting part of or the complete weight of the airplane on two or more such parking dollies, the plane can be moved in any direction over the floor.

Schildmeier, U.S. Pat. No. 2,490,233, issued Dec. 6, 1949, discloses a lift structure for use in lifting and positioning truck wheels for mounting purposes. The Schildmeier lift structure includes a wheeled base, a pair of opposed rollers 18 coupled to the base for supporting a truck wheel, and a hydraulic jack for raising the rollers 18 to allow the truck wheel supported by the rollers 18 to be properly mounted onto a truck. The truck wheel can be rotated upon the rollers 18 to bring the truck wheel into proper registration with an axle of the truck.

Barosko, U.S. Pat. No. 3,145,859, issued Aug. 25, 1964, discloses a jack for removing heavy wheel and tire assemblies from trucks and the like. The Barosko jack includes a wheeled base, arms 58, 60 for engaging and supporting a wheel and tire assembly, and a hydraulic jack 16 for raising the arms 58, 60.

Asher, U.S. Pat. No. 4,771,531, issued Sept. 20, 1988, discloses a device for removing, transporting, and replacing large vehicle wheels and the corresponding brake drums. The Asher device includes a wheeled frame, a pair of wheel lifting arms 32, a brake drum lifting arm 36, and a hydraulic jack 42 for lifting the wheel lifting arms 32 and brake drum lifting arm 36. In operation, a truck is raised until its tire is free from the ground. The wheeled frame is then pushed into place so that the truck tire resides between the wheel lifting arms 32. The nut which secures the wheel to the truck axle is then removed and the hydraulic jack 42 activated to raise the wheel lifting arms 32 and truck wheel until the tension between the truck wheel and truck axle is relieved. A safety chain is wrapped around the wheel to secure the wheel to the wheel lifting arms 32. The device, with the truck wheel secured thereto and with the brake drum secured within the wheel, can then be rolled away from the truck. The wheel can then be lowered to the ground and removed from the device. The wheeled frame can then be pushed around to the opposite side of the wheel and the brake drum lifting arm 36 moved to engage the brake drum. The hydraulic jack 42 is then activated to raise the brake drum lifting arm 36 to allow the brake drum to be removed from the truck wheel.

Nothing in the prior art discloses or suggests the present invention. More specifically, nothing in the prior art discloses or suggests a brake drum support apparatus including, in general, base means for resting on a support surface; drum cradle means for cradling a brake drum of a vehicle while the brake drum is removed from the vehicle; and drum cradle brace means for attaching said drum cradle means to said base means.

SUMMARY OF THE INVENTION

The present invention is directed toward providing a support apparatus for use with a vehicle having a brake drum and for supporting the brake drum as the brake drum is removed from the vehicle. The concept of the present invention is to provide a dolly-like means that will support a brake drum after the related wheel and tire assembly has been removed from about the brake drum which will then allow the brake drum to be safely and easily removed from the related axle and moved to another location.

The brake drum support apparatus of the present invention includes, in general, base means for resting on a support surface; drum cradle means for cradling a brake drum of a vehicle while the brake drum is removed from the vehicle; and drum cradle brace means for attaching said drum cradle means to said base means.

One objective of the present invention is to provide means for allowing a brake drum to be safely removed from a vehicle.

Another objective of the present invention is to provide means for allowing a brake drum to be quickly removed from a vehicle.

Another objective of the present invention is to provide means for allowing a brake drum to be removed from a vehicle without tiring the worker.

DESCRIPTION OF THE PREFERRED EMBODIMENTS

Figure 1:
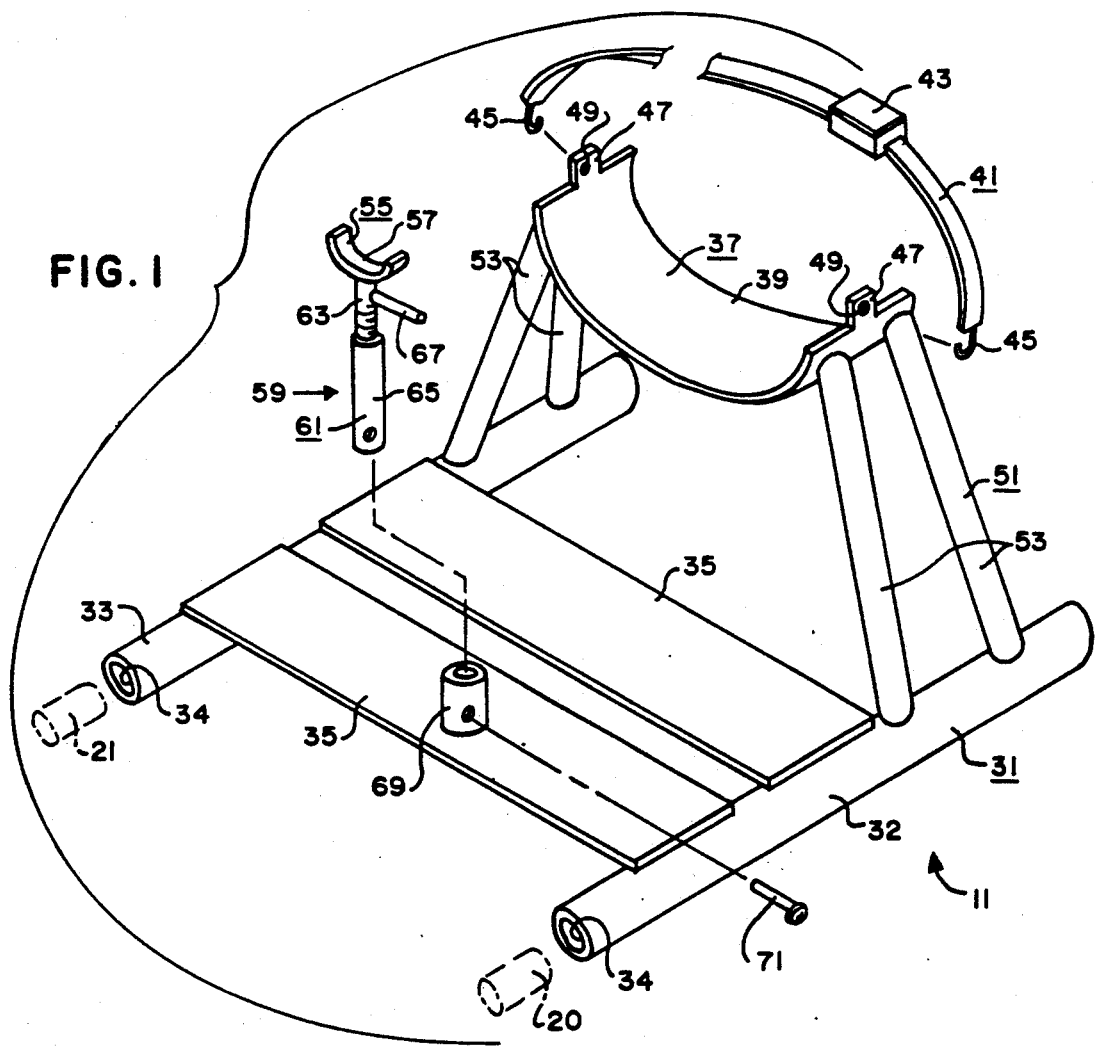
FIG. 1 is an exploded perspective view of a first embodiment of the brake drum support apparatus of the present invention showing a portion of a typical truck wheel dolly in broken lines.
Figure 2:
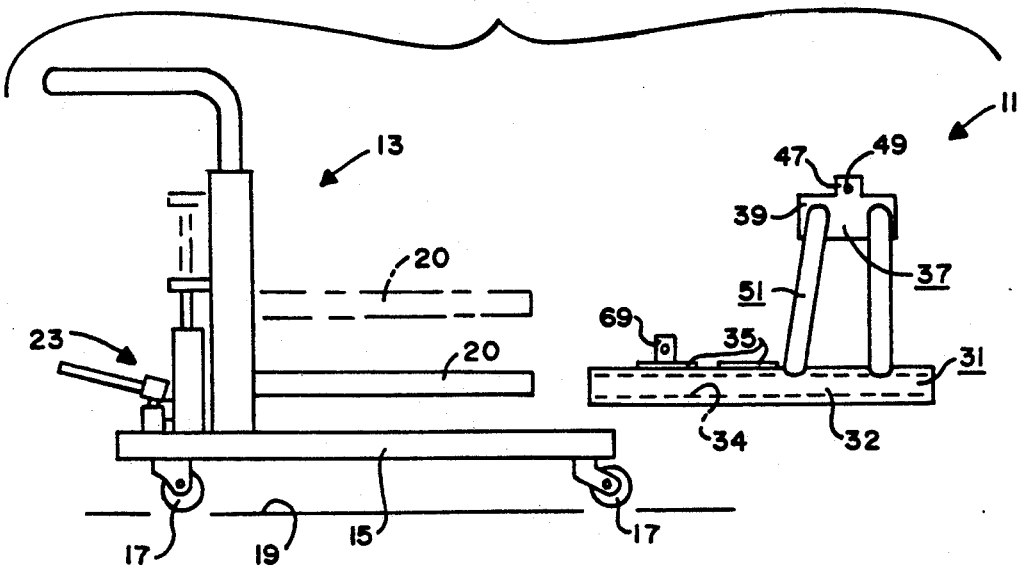
FIG. 2 is a somewhat diagrammatic exploded elevational view of a portion of the brake drum support apparatus of FIG. 1 and a typical truck wheel dolly with portions of the truck wheel dolly shown in a moved position in broken lines.
Figure 3:
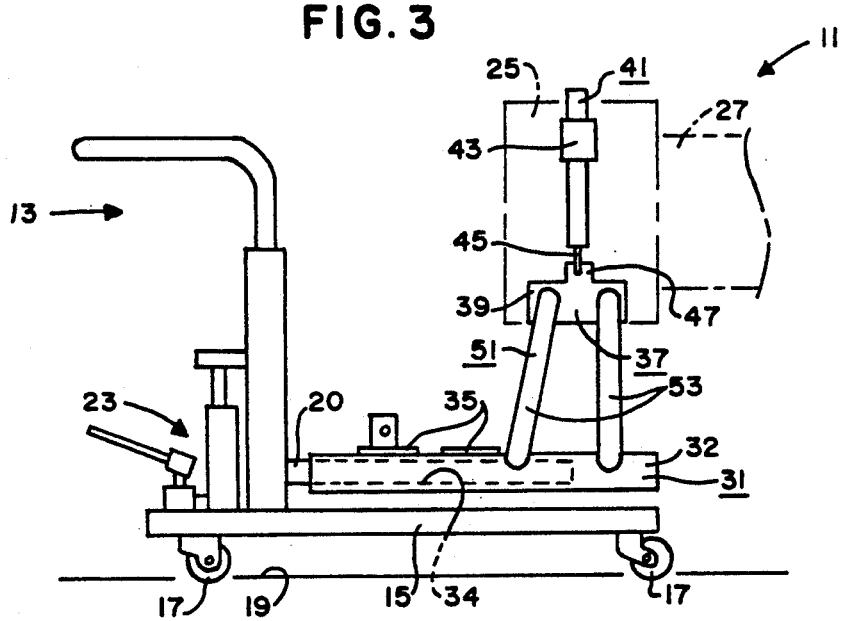
FIG. 3 is a somewhat diagrammatic side elevational view of a portion of the brake drum support apparatus of FIG. 1 shown in combination with a typical truck wheel dolly with a truck brake drum and a portion of a truck wheel axle shown in broken lines.
Figure 4:
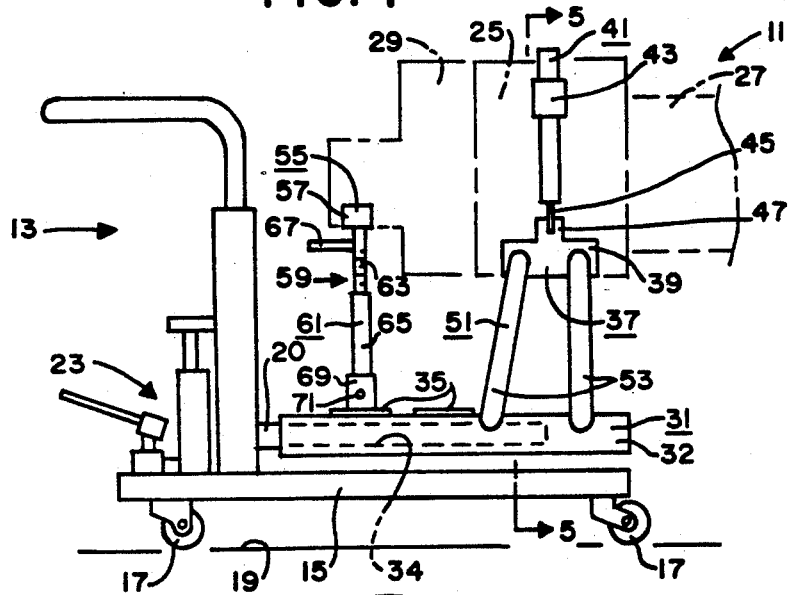
FIG. 4 is a somewhat diagrammatic side elevational view of the brake drum support apparatus of FIG. 1 shown in combination with a typical truck wheel dolly with a truck brake drum, a portion of a truck wheel axle and a truck wheel hub shown in broken lines.

A first embodiment of the brake drum support apparatus of the present invention is shown in FIGS. 1-5 and identified by the numeral 11. The brake drum support apparatus 11 is for use with a typical truck wheel dolly 13 or the like, such as, for example, the lift structure disclosed by Schildmeier, U.S. Pat. No. 2,490,233, issued Dec. 6, 1949, or the jack disclosed by Barosko, U.S. Pat. No. 3,145,859, issued Aug. 25, 1964. Such truck wheel dollies are well known to those skilled in the art for use in the removal, transporting, and replacement of heavy tired truck wheels and the like. The truck wheel dolly 13, as shown in FIGS. 2, 3 and 4, has a base 15 movably supported by casters 17 on a support surface 19. A pair of spaced apart lift arms, i.e., a first lift arm member 20 and a second lift arm member 21, are adjustably mounted on the base 15 for normally supporting a truck wheel or the like as will now be apparent to those skilled in the art. A hydraulic jack 23 is provided on the truck wheel dolly 13 for allowing the lift arm members 20, 21 to be raised and lowered.

The brake drum support apparatus 11 is used with a vehicle such as a tractor trailer type truck having a brake drum 25 that is removably attached to an axle 27 (see FIGS. 3 and 4). A wheel hub 29 is typically removably attached to the brake drum 25 (see FIG. 4) for use in securing a wheel assembly (not shown) to the brake drum 25, etc., as will now be apparent to those skilled in the art. The brake drum support apparatus 11 provides support for the brake drum 25 as the brake drum 25 is removed from the axle 27 of the vehicle.

The brake drum support apparatus 11 includes base means 31 for resting on a support surface. More specifically, the base means 31 preferably includes means for resting on the lift arm members 20, 21 of the truck wheel dolly 13. Such means preferably include an elongated tube member for receiving each of the lift arm members 20, 21 of the truck wheel dolly 13. Thus, the base means 31 preferably includes a pair of spaced apart, parallel tube members, i.e., a first tube or frame member 32 and a second tube or frame member 33. Each tube member 32, 33 has an aperture 34 therein for receiving the respective arm member 20, 21. The tube members 32, 33 are preferably fixedly joined together by one or more cross members 35. The base means 31 is thus designed so that the lift arm members 20, 21 can easily slide into the respective tube members 32, 33 to thereby support the base means 31 on the truck wheel dolly 13 and allow the base means 31 to be raised and lowered with the hydraulic jack 23 as will now be apparent to those skilled in the art. The specific construction of the base means 31 may vary as will now be apparent to those skilled in the art. Thus, for example, the tube members 32, 33 are preferably constructed of an approximately 63.5 millimeters (2.5 inch) diameter rigid metal pipe approximately 0.6 meter (24 inches) long and the cross members 35 are preferably constructed of rigid metal plates welded or otherwise fixedly attached to the tube members 32, 33 so as to space the tube members 32, 33 approximately 0.53 meters (21 inches) apart, center to center.

The brake drum support apparatus 11 includes drum cradle means 37 for cradling the brake drum 25 while the brake drum 25 is removed from the axle 27 of the vehicle. The drum cradle means 37 preferably includes an arcuate plate 39 for receiving a portion of the bottom of the brake drum 25 as clearly shown in FIG. 5. The specific curve of the arcuate plate 39 may vary but should have a depth sufficient to allow the brake drum 25 to substantially securely rest thereon as will now be apparent to those skilled in the art. Thus, for example, the arcuate plate 39 may have a depth of approximately 127 millimeters (5 inches). The specific construction of the drum cradle means 37 may vary as will now be apparent to those skilled in the art. Thus, for example, the arcuate plate 39 is preferably constructed of a rigid metal plate bent or otherwise configured to the shape shown in FIG. 1.

To more securely support the brake drum 25 on the drum cradle means 37, the brake drum support apparatus 11 preferably includes strap means 41 for strapping the brake drum 25 to the drum cradle means 37. The strap means 41 is preferably adjustable for tightly strapping the brake drum 25 to the drum cradle means 37.

Figure 5:
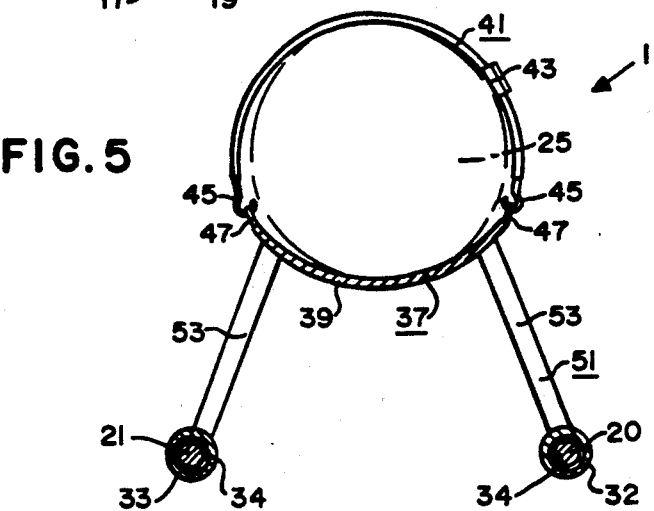
FIG. 5 is an elevational view substantially as taken on line 5—5 of FIG. 4 in a somewhat enlarged scale.

More specifically, the strap means 41 preferably includes a ratchet means 43 or the like for adjusting the effective length thereof as will now be apparent to those skilled in the art. The strap means 41 preferably includes a hook member 45 at each end thereof. An ear member 47 having an aperture 49 therethrough is preferably provided on each end of the arcuate plate 39 as clearly shown in FIG. 1 for allowing the strap means 41 to be secured to the drum cradle means 37 by the hook members 45 as shown in FIG. 5.

The brake drum support apparatus 11 includes drum cradle brace means 51 for attaching the drum cradle means 37 to the base means 31. The drum cradle brace means 51 preferably includes a plurality of rigid leg members 53 extending between the tube members 32, 33 and the arcuate plate 39 as clearly shown in FIG. 1. The specific construction of the drum cradle brace means 51 may vary as will now be apparent to those skilled in the art. Thus, for example, each leg member 53 is preferably constructed of an approximately 38.1 millimeters (1.5 inch) diameter rigid metal pipe welded or otherwise fixedly attached to the respective tube member 32, 33 and the arcuate plate 39 so as to space the arcuate plate 39 approximately 0.36 meters (14 inches) above the base means 31.

The brake drum support apparatus 11 preferably includes hub cradle means 55 for cradling the wheel hub 29 as the brake drum 25 is removed from the axle 27 of the vehicle with the wheel hub 29 attached to the brake drum 25. The hub cradle means 55 preferably includes an arcuate plate 57 for receiving a portion of the bottom of the wheel hub 29. The specific curve of the arcuate plate 57 may vary but should have a depth sufficient to allow the wheel hub 29 to substantially securely rest thereon as will now be apparent to those skilled in the art. The specific construction of the hub cradle means 55 may vary as will now be apparent to those skilled in the art. Thus, for example, the arcuate plate 57 is preferably constructed of a rigid metal plate bent or otherwise configured to the shape shown in FIG. 1.

The brake drum support apparatus 11 preferably includes hub cradle brace means 59 for attaching the hub cradle means 55 to the base means 3; . The hub cradle brace means 59 preferably includes hub cradle jack means 61 for allowing the height of the hub cradle means 55 to be raised and lowered. The hub cradle jack means 61 preferably includes an elongated, externally threaded rod member 63 having a first end welded or otherwise fixedly attached to the arcuate plate 57, and an elongated, internally threaded member 65 for being fixedly attached to the base means 31 and for screwably receiving the externally threaded rod member 63 so tha rotation of the externally threaded rod member 63 will cause the arcuate plate 57 to be raised and lowered with respect to the base means 31 as will now be apparent to those skilled in the art. A handle 67 is preferably attached to the externally threaded rod member 63 for use in rotating the externally threaded rod member 63 as will now be apparent to those skilled in the art. The hub cradle means 55 and the hub cradle brace means 59 are preferably removably attached to the base means 31 for allowing easy removal thereof when not needed (e.g., when the wheel hub 29 is removed from the brake drum 25 before the brake drum 29 is removed from the axle 27). Thus, a socket member 69 may be attached to one of the cross members 35 as clearly shown in FIG. 1 for receiving the lower end of the internally threaded member 65 and a pin 71 may be provided to extend through transverse apertures in the socket member 69 and the lower end of the internally threaded member 65 to removably secure the internally threaded member 65 to the base means 31 as will now be apparent to those skilled in the art.

To use the brake drum support apparatus 11 to support a brake drum 25 as the brake drum 25 is removed from the axle 27 of a vehicle, the wheel assembly is first removed from the axle 27 in any typical manner. Next, a truck wheel dolly 13 is used to move the arcuate plate 39 of the drum cradle means 37 beneath the brake drum 25 in a supporting position as shown in FIG. 3. The strap means 41 can then be used to secure the brake drum 25 to the drum cradle means 37. If the wheel hub 29 is left on the brake drum 25 when the wheel assembly is removed from the axle 27, the arcuate plate 57 of the hub cradle means 55 is also moved beneath the wheel hub 29 in a supporting position. The nuts or bolts holding the brake drum 25 to the axle 27 can then be removed and the brake drum 25 can easily be rolled away from the axle 27, serviced, and rolled back to the axle 27 for reattachment in a quick, easy, and safe, one-person operation as will now be apparent to those skilled in the art.

Figure 6:
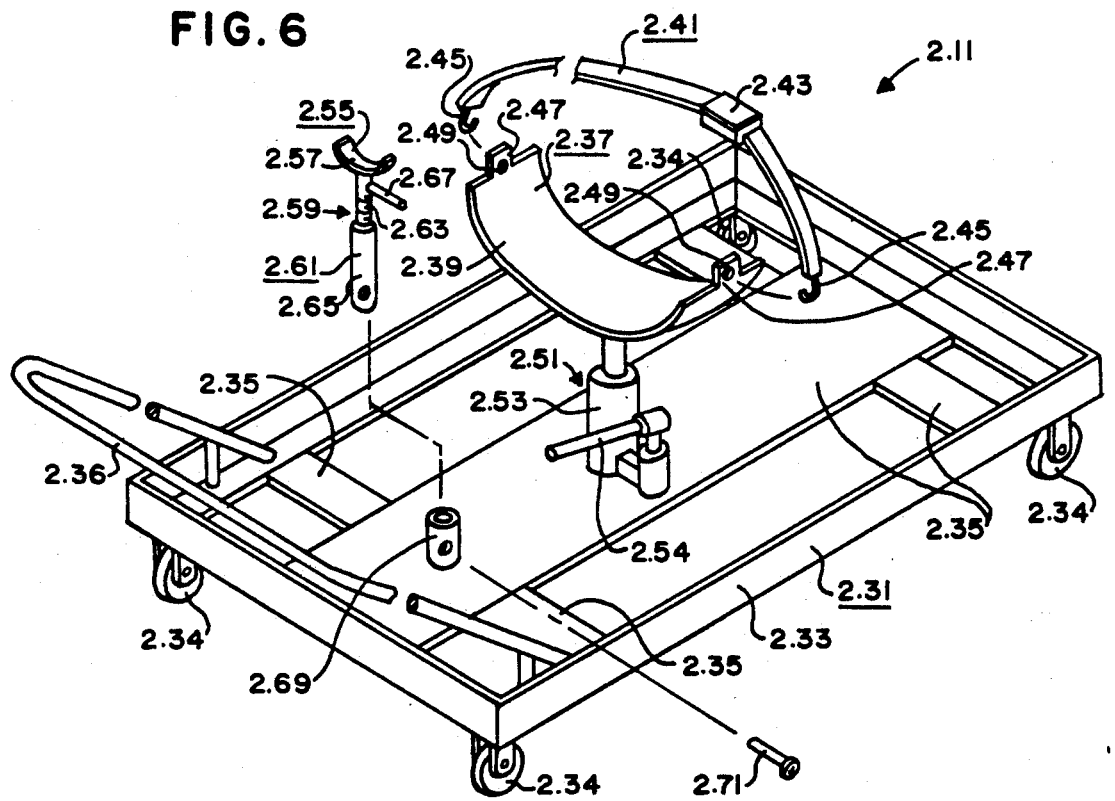
FIG. 6 is an exploded perspective view of a second embodiment of the brake drum support apparatus of the present invention.
Figure 7:
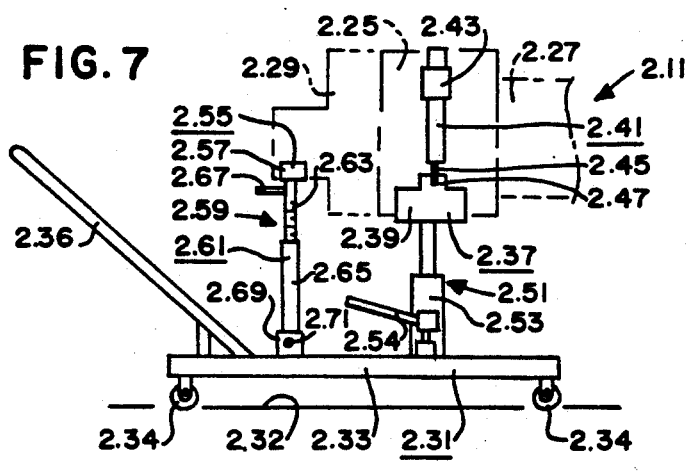
FIG. 7 is a somewhat diagrammatic side elevational view of a portion of the brake drum support apparatus of FIG. 6 with a truck brake drum, a portion of a truck wheel axle shown in broken lines and a truck wheel hub shown in broken lines.
Figure 8:
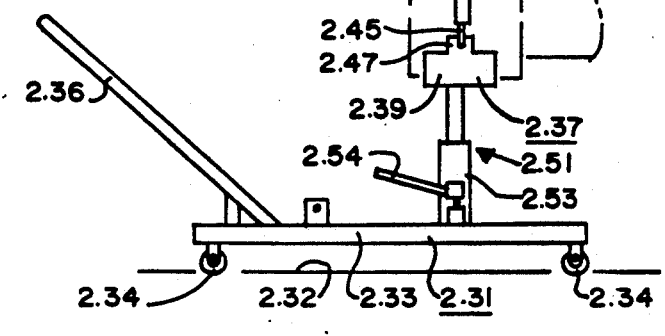
FIG. 8 is a somewhat diagrammatic side elevational view of the brake drum support apparatus of FIG. 6 with a truck brake drum and a portion of a truck wheel axle shown in broken lines.

A second embodiment of the brake drum support apparatus of the present invention is shown in FIGS. 6–8 and identified by the numeral 2.11. The brake drum support apparatus 2.11 is used with a vehicle such as a tractor trailer type truck having a brake drum 2.25 that is removably attached to an axle 2.27 (see FIGS. 7 and 8). A wheel hub 2.29 is typically removably attached to the brake drum 2.25 (see FIG. 7) for use in securing a wheel assembly (not shown) to the brake drum 2.25, etc., as will now be apparent to those skilled in the art. The brake drum support apparatus 2.11 provides support for the brake drum 2.25 as the brake drum 2.25 is removed from the axle 2.27 of the vehicle.

The brake drum support apparatus 2.11 includes base means 2.31 for resting on a support surface 2.32. More specifically, the base means 2.31 preferably includes a frame 2.33 movably supported by wheel means such as typical casters 2.34 for allowing the brake drum support apparatus 2.11 to be rolled over the support surface 2.32, etc. One or more cross members 2.35 preferably extend across the frame 2.33 to strengthen the base means 2.31, etc. Handle means 2.36 is preferably attached to one end of the base means 2.31 to allow the base means 2.31 to be easily moved on the support surface 2.32 and for allowing the movement of the brake drum support apparatus 2.11 to be easily controlled as will now be apparent to those skilled in the art. The specific construction of the base means 2.31 and handle means 2.36 may vary as will now be apparent to those skilled in the art. Thus, for example, frame 2.33 and cross members 2.35 are preferably constructed out of rigid metal angle iron and plates, and welded or otherwise fixedly attached together to form a strong, rigid structure. The handle means 2.36 may be constructed out of rigid metal pipe or the like fixedly attached to the frame 2.33 by welding or the like.

The brake drum support apparatus 2.11 includes drum cradle means 2.37 for cradling the brake drum 2.25 while the brake drum 2.25 is removed from the axle 2.27 of the vehicle. The drum cradle means 2.37 preferably includes an arcuate plate 2.39 for receiving a portion of the bottom of the brake drum 2.25. The specific curve of the arcuate plate 2.39 may vary but should have a depth sufficient to allow the brake drum 2.25 to substantially securely rest thereon as will now be apparent to those skilled in the art. Thus, for example, the arcuate plate 2.39 may have a depth of approximately 127 millimeters (5 inches). The specific construction of the drum cradle means 2.37 may vary as will now be apparent to those skilled in the art. Thus, for example, the arcuate plate 2.39 is preferably constructed of a rigid metal plate bent or otherwise configured to the shape shown in FIG. 6.

To more securely support the brake drum 2.25 on the drum cradle means 2.37, the brake drum support apparatus 2.11 preferably includes strap means 2.41 for strapping the brake drum 2.25 to the drum cradle means 2.37. The strap means 2.41 is preferably adjustable for tightly strapping the brake drum 2.25 to the drum cradle means 2.37. More specifically, the strap means 2.41 preferably includes a ratchet means 2.43 or the like for adjusting the effective length thereof as will now be apparent to those skilled in the art. The strap means 2.41 preferably includes a hook member 2.45 at each end thereof. An ear member 2.47 having an aperture 2.49 therethrough is preferably provided on each end of the arcuate plate 2.39 as clearly shown in FIG. 6 for allowing the strap means 2.41 to be secured to the drum cradle means 2.37 by the hook members 2.45.

The brake drum support apparatus 2.11 includes drum cradle brace means 2.51 for attaching the drum cradle means 2.37 to the base means 2.31. The drum cradle brace means 2.51 preferably includes adjustment means for allowing the height of the drum cradle means 2.37 relative to the support surface 2.32 to be varied. The drum cradle adjustment means preferably includes drum cradle jack means 2.53 for allowing the height of the drum cradle means 2.37 to be raised and lowered. The drum cradle jack means 2.53 preferably consists of a typical hydraulic jack with a base fixedly attached to one of the cross members 2.35 of the base means 2.31 and with a piston rod fixedly attached to the arcuate plate 2.39 so that operation of the handle 2.54 thereof will cause the arcuate plate 2.39 to be raised and lowered as will now be apparent to those skilled in the art.

The brake drum support apparatus 2.11 preferably includes hub cradle means 2.55 for cradling the wheel hub 2.29 as the brake drum 2.25 is removed from the axle 2.27 of the vehicle with the wheel hub 2.29 attached to the brake drum 2.25. The hub cradle means 2.55 preferably includes an arcuate plate 2.57 for receiving a portion of the bottom of the wheel hub 2.29. The specific curve of the arcuate plate 2.57 may vary but should have a depth sufficient to allow the wheel hub 2.29 to substantially securely rest thereon as will now be apparent to those skilled in the art. The specific construction of the hub cradle means 2.55 may vary as will now be apparent to those skilled in the art. Thus, for example, the arcuate plate 2.57 is preferably constructed of a rigid metal plate bent or otherwise configured to the shape shown in FIG. 6.

The brake drum support apparatus 2.11 preferably includes hub cradle brace means 2.59 for attaching the hub cradle means 2.55 to the base means 2.31. The hub cradle brace means 2.59 preferably includes hub cradle jack means 2.61 for allowing the height of the hub cradle means 2.55 to be raised and lowered. The hub cradle jack means 2.61 preferably includes an elongated, externally threaded rod member 2.63 having a first end welded or otherwise fixedly attached to the arcuate plate 2.57, and an elongated, internally threaded member 2.65 for being fixedly attached to the base means 2.31 and for screwably receiving the externally threaded rod member 2.63 so that rotation of the externally threaded rod member 2.63 will cause the arcuate plate 2.57 to be raised and lowered with respect to the base means 2.31 as will now be apparent to those skilled in the art. A handle 2.67 is preferably attached to the externally threaded rod member 2.63 for use in rotating the externally threaded rod member 2.63 as will now be apparent to those skilled in the art. The hub cradle means 2.55 and the hub cradle brace means 2.59 are preferably removably attached to the base means 2.31 for allowing easy removal thereof when not needed (e.g., when the wheel hub 2.29 is removed from the brake drum 2.25 before the brake drum 2.25 is removed from the axle 2.27). Thus, a socket member 2.69 may be attached to one of the cross members 2.35 as clearly shown in FIG. for receiving the lower end of the internally threaded member 2.65 and a pin 2.71 may be provided to extend through transverse apertures in the socket member 2.69 and the lower end of the internally threaded member 2.65 to removably secure the internally threaded member 2.65 to the base means 2.31 as will now be apparent to those skilled in the art.

To use the brake drum support apparatus 2.11 to support a brake drum 2.25 as the brake drum 2.25 is removed from the axle 2.27 of a vehicle, the wheel assembly is first removed from the axle 2.27 in any typical manner. Next, the base means 2.31 is used to move the arcuate plate 2.39 of the drum cradle means 2.37 beneath the brake drum 2.25 in a supporting position as shown in FIG. 8. The strap means 2.41 can then be used to secure the brake drum 2.25 to the drum cradle means 2.37. If the wheel hub 2.29 is left on the brake drum 2.25 when the wheel assembly is removed from the axle 2.27, the arcuate plate 2.57 of the hub cradle means 2.55 is also moved beneath the wheel hub 2.29 in a supporting position as shown in FIG. 7. The nuts or bolts holding the brake drum 2.25 to the axle 2.27 can then be removed and the brake drum 2.25 can easily be rolled away from the axle 2.27, serviced, and rolled back to the axle 2.27 for reattachment in a quick, easy, and safe, one-person operation as will now be apparent to those skilled in the art.

Although the present invention has been described and illustrated with respect to a preferred embodiment and a preferred use therefor, it is not to be so limited since modifications and changes can be made therein which are within the full intended scope of the invention.

I claim:

1. A brake drum support apparatus for use with a vehicle having a brake drum and a wheel hub attached to said brake drum, and for supporting said brake drum and said wheel hub as said brake drum is removed from said vehicle; said brake drum support apparatus comprising:
   (a) base means for resting on a support surface;
   (b) drum cradle means for cradling said brake drum of said vehicle while said brake drum is removed from said vehicle;
   (c) drum cradle brace means for attaching said drum cradle means to said base means; said drum cradle brace means including drum cradle adjustment means for allowing the height of said drum cradle means relative to said support surface to be varied; said drum cradle adjustment means including drum cradle jack means for allowing said drum cradle means to be raised and lowered, said drum cradle jack means including a hydraulic jack having a base for being attached relative to said base means and having a piston rod for being attached relative to said drum cradle means;

(d) hub cradle means for cradling said wheel hub of said vehicle as said brake drum is removed from said vehicle; and (e) hub cradle brace means for attaching said hub cradle means to said base means; said hub cradle brace means including hub cradle jack means for allowing said hub cradle means to be raised and lowered; said hub cradle jack means including a rod member having a first end for being attached relative to said hub cradle means and having a threaded second end, and including a threaded member for being attached relative to said base means and for coacting with said threaded second end of said rod member so that rotation of said rod member relative to said base means will cause said hub cradle means to be raised and lowered.

2. The brake drum support apparatus of claim 1 in which said rod member of said hub cradle jack means and said hub cradle means can be removed from said base means.

3. A brake drum support apparatus for use with a wheel dolly and a vehicle having a brake drum and a wheel hub attached tos aid brake drum, and for supporting said brake drum and said wheel hub as said brake drum is removed from said vehicle; said wheel dolly having a first arm member and a second arm member and having jack means for allowing said first and second arm members to be raised and lowered; said brake drum support apparatus comprising:

(a) base means for being attached to said wheel dolly; said base means including a first frame member having an aperture therein for receiving said first arm member of said wheel dolly and including a second frame member having an aperture therein for receiving said second arm member fo said wheel dolly and for allowing said base means to be raised and lowered with said first and second arm members of said wheel dolly;

(b) drum cradle means for cradling said brake drum of said vehicle while said brake drum is removed from said vehicle;

(c) drum cradle brace means for attaching said drum cradle means to said base meansand for allowing said drum cradle means to be raised and lowered with said first and second arm members of said wheel dolly;

(d) hub cradle means for cradling said wheel hub of said vehicle as said brake drum is removed from said vehicle; and (e) hub cradle brace means for attaching said hub cradle means to said base means; said hub cradle brace means including hub cradle jack means for allowing said hub cradle means to be raised and lowered; said hub cradle jack means including a rod member having a first end for being attached relative to said hub cradle means and having a threaded second end, and including a threaded member for being attached relative to said base means and for coacting with said threaded second end of said rod member so that rotation of said rod member relative to said base means will cause said hub cradle means to be raised and lowered.

4. The brake drum support apparatus of claim 3 in which said rod member of said hub cradle jack means and said hub cradle means can be removed from said base means.

* * * * *